(12) United States Patent
Auer

(10) Patent No.: US 10,856,523 B2
(45) Date of Patent: Dec. 8, 2020

(54) ANIMAL EAR TAG

(71) Applicant: SMARTBOW GMBH, Weibern (AT)

(72) Inventor: Wolfgang Auer, Weibern (AT)

(*) Notice: Subject to any disclaimer, the term of this patent is extended or adjusted under 35 U.S.C. 154(b) by 295 days.

(21) Appl. No.: 15/567,258

(22) PCT Filed: Apr. 29, 2016

(86) PCT No.: PCT/AT2016/000048
§ 371 (c)(1),
(2) Date: Oct. 17, 2017

(87) PCT Pub. No.: WO2016/172745
PCT Pub. Date: Nov. 3, 2016

(65) Prior Publication Data
US 2018/0132449 A1 May 17, 2018

(30) Foreign Application Priority Data

Apr. 30, 2015 (AT) .................................... 261/2015
Apr. 30, 2015 (AT) .................................... 262/2016
Jan. 13, 2016 (AT) ........................................ 8/2016

(51) Int. Cl.
*A01K 11/00* (2006.01)
*A01K 29/00* (2006.01)

(52) U.S. Cl.
CPC .......... *A01K 11/004* (2013.01); *A01K 29/005* (2013.01)

(58) Field of Classification Search
CPC .... A01K 11/00; A01K 11/001; A01K 11/004; A01K 11/006; A01K 29/005
USPC ............... 606/116, 117; 40/300, 301, 299.01
See application file for complete search history.

(56) References Cited

U.S. PATENT DOCUMENTS

| 4,635,389 A | 1/1987 | Oudelette |
| 4,854,328 A | 8/1989 | Pollack |
| 2008/0236001 A1 | 10/2008 | Huenefeld |
| 2009/0094869 A1 | 4/2009 | Geissler et al. |
| 2013/0255593 A1 | 10/2013 | Hilarides |

FOREIGN PATENT DOCUMENTS

| AT | 509892 B1 | 6/2014 |
| BY | 7144 C1 | 3/2005 |
| EP | 2191715 A1 | 6/2010 |
| EP | 2214474 A1 | 8/2010 |
| JP | 2014180217 A | 9/2014 |

(Continued)

OTHER PUBLICATIONS

International Search Report (in English and German) issued in PCT/AT2016/000048, dated Aug. 3, 2016, ISA/EPO, Rijswijk. 11.

(Continued)

*Primary Examiner* — Diane D Yabut
(74) *Attorney, Agent, or Firm* — Harness, Dickey & Pierce, P.L.C.

(57) ABSTRACT

An animal ear tag is anchorable on an animal's ear by means of a dome and has a housing enclosing an electronics assembly and a battery, and a panel surface on which identification data relating to the animal are directly visible in clearly legible characters, wherein the panel surface is located below the housing when the ear tag is placed on the animal. The center of gravity of the housing and of the parts enclosed by the latter lies inside an area protruding downwards from the spike axis, which area is not higher and 2 cm and, in the horizontal lying normal to the spike axis, is not wider than 1 cm.

12 Claims, 8 Drawing Sheets

(56) References Cited

FOREIGN PATENT DOCUMENTS

Figure 1:
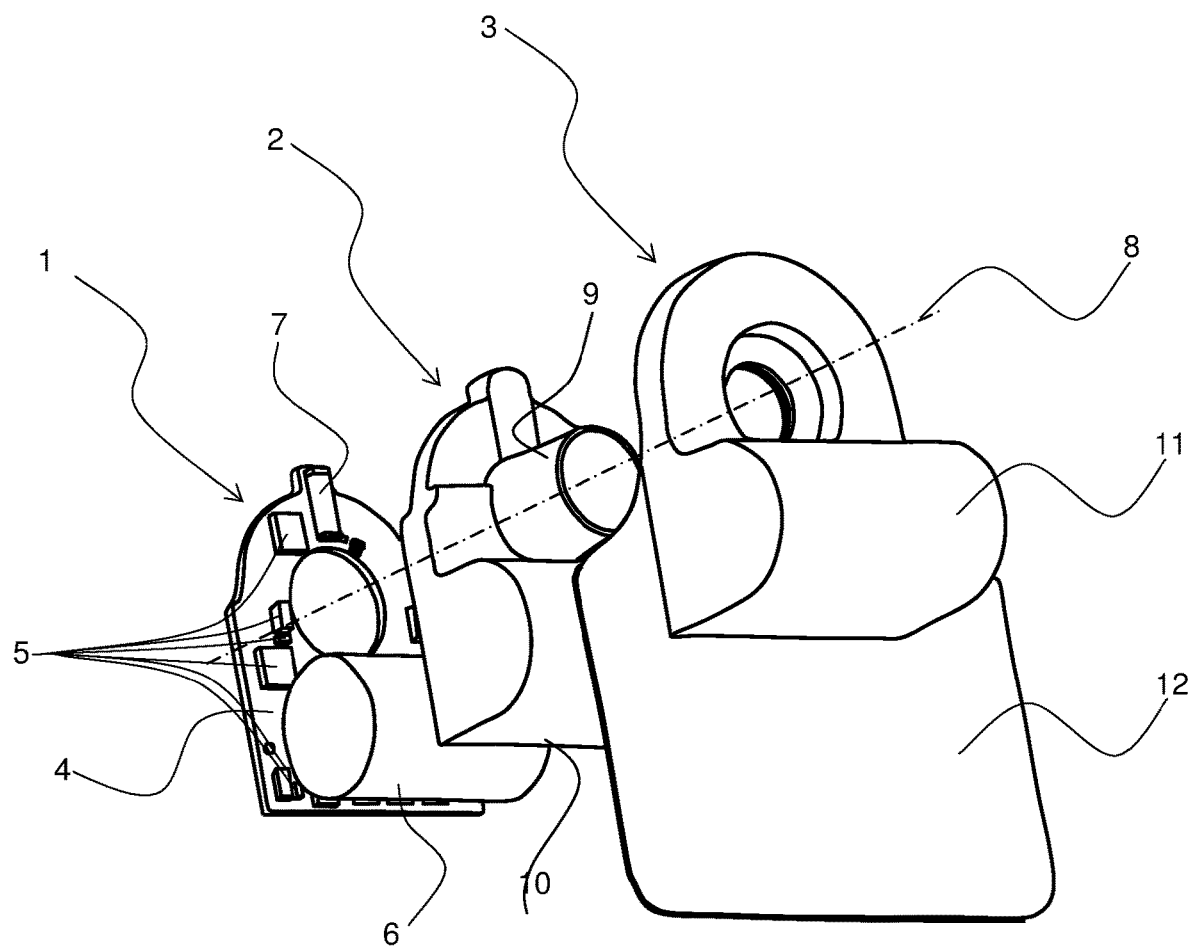

| RU | 10999 U1 | 9/1999 |
| SU | 1473697 A3 | 4/1989 |
| WO | WO-2007079941 A1 | 7/2007 |
| WO | WO-2009034497 A2 | 3/2009 |

OTHER PUBLICATIONS

Written Opinion (in German) of the International Searching Authority issued in PCT/AT2016/000048, dated Aug. 3, 2016, ISA/EPO, Rijswijk.

ANIMAL EAR TAG

CROSS-REFERENCE TO RELATED APPLICATIONS

This application is a 371 U.S. National Stage of International Application No. PCT/AT2016/000048, filed Apr. 29, 2016, which claim the benefit of and priority to Austrian Patent Applications Numbers A 261/2015, filed Apr. 30, 2015; A262/2015, filed Apr. 30, 2015; and A 8/2016, filed Jan. 13, 2016. The entire disclosures of the above applications are incorporated herein by reference.

The invention relates to an animal ear tag.

According to intended use, an animal ear tag makes available information about the animal. This information can be provided in the form of written characters which can be read directly by the human eye or by means of information in the form of electronic data.

Animal ear tags of the designs referred to here have to be secured to the animal's ear by means of an arbor, that is to say a narrow elongate part, wherein the arbor is monolithically connected to a backing plate. In the state in which the tag is attached to the animal's ear, the arbor projects from the backing plate through a passage hole in the ear concha of the animal's ear to the animal ear tag and is secured thereto by its free end.

In so far as the animal ear tag is composed, apart from the securing region, only of a flat, two-dimensional planar part on which the information about the animal is provided in the form of written characters which can be read directly by the human eye, the term "label-type animal ear tag" is used. The part on which the said characters are provided is referred to as the "label surface". Typically, at least the so-called "life number" is attached in a easily readable fashion to the label surface. The life number is an identification number which is assigned to the animal and clearly identifies the animal during its entire life.

In order to avoid falsification and deception, label-type animal ear tags are embodied according to the intended use in such a way that they cannot be removed from the animal without destroying them. In certain cases, label-type animal ear tags are equipped, in addition to the visibly attached identification number, with a planar, passive electronic transponder, usually referred to as an "RFID tag" from which an electronically stored identification number can be read by radio. "Passive" means that the transponder itself does not contain any permanent energy store. In order to read out the information, the necessary energy is provided by radio, by means of a reading device which is located in the vicinity. Label-type animal ear tags which also have a passive electronic transponder are presented, for example, by EP 2191715 B1 and WO 2007079941 A1. According to the EP document, a passive RFID transponder is arranged in an annular shape, around the arbor axis of the animal ear tag. According to the WO document, a passive transponder is located in an elongate housing part of the animal ear tag, which housing part is arranged at a distance from the arbor axis and is oriented inclined with respect to the horizontal.

Animal ear tags which, in addition to electronic circuit elements, typically sensors, radio receivers, radio transmitters and data memories, also have a permanent storage means for electrical energy such as typically a battery or an accumulator, are also referred to in this document as "active animal ear tags". Such an ear tag is an active electronic device.

Active animal ear tags usually serve for the approximately permanent monitoring of states and types of behavior of the animal and for this purpose carry out measurements and data processing using their electronics and communicate by radio with further devices.

Active animal ear tags are also normally provided with marking on the outside of a housing which holds the electrical or electronic parts, usually with a number which characterizes the active animal ear tag itself, but does not characterize that animal which is wearing the active animal ear tag.

Active animal ear tags are presented, for example, in documents AT 509892 B1 and WO 2009034497 A2.

The identification information relating to the animal can be stored in the active animal ear tag in the form of unchangeable electronic data, or a label-type animal ear tag can also be attached to the animal in addition to the active animal ear tag.

U.S. Pat. No. 4,854,328 A describes an animal ear tag which is a combination of a label-type animal ear tag and an active animal ear tag. The housing for the battery and the active electronic component is embodied in a broad and flat fashion. One of the two large outer surfaces of the housing is formed by a part of the label surface according to the above definition. The housing is located underneath the arbor axis at a distance therefrom. In addition, light emitting diodes are attached to the label surface. A disadvantage of this combined design is that although the animal ear tag has a relatively large surface, it is not flat, thin and flexible on the large surface. Therefore, there is an increased risk of injuries to the animal. Furthermore, it is disadvantageous that the center of gravity of the animal ear tag lies so far underneath the arbor axis that the animal ear tag tends to swing on the animal, causing the animal's ear to be scuffed. WO 2009034497 A2 presents a similar design with the same disadvantages.

Under the designation "CowManager", the company Agis Automatisierung has marketed a specially "combined" animal ear tag. This ear tag was presented on the Internet at the end of 2015 at the address https://www.cowmanager.com/de-de/. The life number is printed visibly on a flat ring which runs around the arbor receptacle. An approximately pocket-shaped housing, which contains the electrical and/or electronic components of an active animal ear tag, is connected to the ring and detachable therefrom if the animal ear tag is not located on an animal's ear. It is again disadvantageous that the center of gravity of the animal ear tag lies so far underneath the arbor axis that the animal ear tag tends to swing on the animal and therefore cause scuffing of the animal's ear.

WO 2009034497 A2, which has already been mentioned above, presents an active ear tag which is also in the form of a label. The electronic components are enclosed in a cavity between two essentially flat housing parts, which can serve as a label. The two flat housing parts are connected to one another by a third housing part, which surrounds the edges of the essentially flat housing parts and is applied to the flat housing parts by encapsulation by injection molding. Said cavity is also closed off in a liquid-tight manner with respect to the surroundings by the third housing part. It is an advantage of the design according to WO 2009034497 A2 that a label-shaped ear tag and an active ear tag are combined with one another in this way. It is a problem that the electrical and/or electronic components cannot be detached from the ear tag without destruction. However, it is the case that a label-type ear tag usually does not have to be detached from the animal during the entire lifetime of the animal which is provided with said tag, but the active electronic components of the ear tag have to be serviced at relatively short intervals. It is often also not even necessary to equip an animal during its entire lifetime with an active ear tag, but rather with a label-type ear tag because this ear tag bears the life number.

AT 509892 B1 describes an active animal ear tag without a label surface. The arbor is monolithically connected to a part of the housing which holds the electrical and electronic components. The center of gravity of the animal ear tag which has a relatively small area lies on the arbor axis; this ensures that the animal ear tag does not swing or oscillate during movements of the animal. It is disadvantageous that when the ear tag is attached to the animal, during which process as is known a passage hole has to be made through the ear concha of the animal by the arbor, the arbor cannot be reinforced by a removable inner pin and therefore has to be permanently rigid. Furthermore, it is disadvantageous that in many cases an additional and therefore separate label-type animal ear tag is necessary for legal reasons.

The object on which the invention is based is to embody an animal ear tag, having an arbor receptacle and both being an active animal ear tag and having a label surface, in an improved way to the effect that all the following objectives can be achieved together:

The label surface can be large, flat and flexible (—so that the readable characters can be made very large and the surface nevertheless does not scuff or become stuck).

The animal ear tag hangs from the animal's ear in a defined position (—so that the written information can be easily read and in order to maintain optimum radio conditions).

Even if a powerful electronic circuit arrangement is included together with a sufficiently strong battery or accumulator, the animal ear tag does not tend to swing (—in order to avoid scuffing of the animal's ear).

The exchange of a battery or of an empty accumulator is easily possible but the updating of software or the actual replacement of the electronics (—this replacement is appropriate, for example, after further developments of circuits or if requirements change, for example with respect to features to be monitored on the animal which is provided with the ear tag) is also easily possible.

To achieve the object, the invention proposes the combination of the following three features:

a) The center of gravity of those parts of the animal ear tag which are to be considered part of the active animal ear tag (circuit board, electronic components (incl. sensors), battery, protective housing . . . ) lies within a region which projects 2 cm below the arbor axis and is 1 cm wide.

b) While complying with feature a), those parts of the animal ear tag which are to be considered part of the active animal ear tag are located as close as possible to that line on which the arbor axis lies when the ear tag is attached. (This ensures that the moment of mass inertia of the active animal ear tag about the arbor axis is as small as possible).

c) The label surface of the animal ear tag lies underneath those parts of the animal ear tag which are to be considered as part of the active animal ear tag.

The significant effect which is achieved by the combination of the features a, b and c is that the animal ear tag hangs from the animal's ear in a defined position and at the same time nevertheless virtually never swings or rotates with respect to the animal's ear about the axis of the arbor.

d) In one particular preferred design, a housing which contains said electrical and/or electronic components can be detachably connected to the label surface. "Detachably" in this sense means that the respective connection can be detached and restored repeatedly without destruction of any parts, with the result that electrical and/or electronic components including electrical energy storage elements such as batteries or accumulators can be removed from the ear tag without at the same time the animal ear tag being damaged or having to be removed from the living animal.

As a result of the features a) and c) the total center of gravity of the animal ear tag lies within a small region which projects downward from the arbor axis, that is to say directly on the arbor axis or as close as possible underneath the arbor axis, when the animal ear tag is attached with the orientation according to the intended use on the animal's ear. As a result, the animal ear tag hangs in a defined position without swinging.

The center of gravity of those parts of the animal ear tag which are to be considered part of the active animal ear tag (circuit board, electronic components (incl. sensors), battery, protective housing . . . ) are to be in a region which is located 2 cm below the arbor axis and is at maximum 1 cm wide. If the center of gravity of the total animal ear tag were to be on the arbor axis, the animal ear tag could rest in a stable fashion in a state in which it is rotated randomly about the arbor axis. If the center of gravity were to be too far from the arbor axis, the animal ear tag would tend to swing about the arbor axis when the animal moves.

If the moment of mass inertia were too large, the animal ear tag would tend to rotate along when the animal swings its head around axes which run parallel to the axis of the arbor.

In order to implement feature a), the circuit board which bears electrical and/or electronic components is embodied in an annular shape and arranged in such a way that it surrounds the arbor axis. If just one battery is used, the battery is arranged bearing directly against that housing wall which lies directly below the arbor (given an orientation of the animal ear tag on the animal's ear according to intended use).

If a plurality of batteries are used, the total center of gravity of the animal ear tag can be influenced decisively by the arrangement of the batteries. According to the invention, the batteries are to be arranged in such a way that the total center of gravity of all the batteries lies on the arbor axis or just below it, and that the distance between the individual batteries and the arbor axis is as small as possible.

The housing of the active animal ear tag is necessarily rigid, which is, however, disadvantageous for the wearing comfort. Feature b) ensures, in addition to the minimization of the moment of mass inertia, that the hard housing can have the smallest possible area; in this way, the negative effect on the wearing comfort can be kept small and the space for the label surface is restricted to the smallest possible degree.

In order to implement feature (d) it is advantageous to embody the detachable connection between the active ear tag and the label surface as a clamped connection, that is to say as a connection which holds at least partially by elastic deformation of parts which bear against one another and therefore increased friction of the parts against one another. Such connections can be implemented well in such a way that the connected parts are secured against one another without play and can be repeatedly closed and opened again without destruction. Examples of clamped connections are latched connections with elastically prestressed hooks, bayonet connections, screw connections with stiff movement (that is to say which constitute a slight interference fit), plug-in type wedge connections, most snap-action connections.

For the specific embodiment of animal ear tags which satisfy feature d) ("detachability of an active animal ear tag from a label-type animal ear tag") there are a multiplicity of possible variations. At any rate it is important that the active ear tag parts can be released quickly and easily from the label surface, that the label surface is not destroyed at the same time and that the animal which wears the ear tag is not troubled or has to be restrained for a long time in this context.

Figure 2:
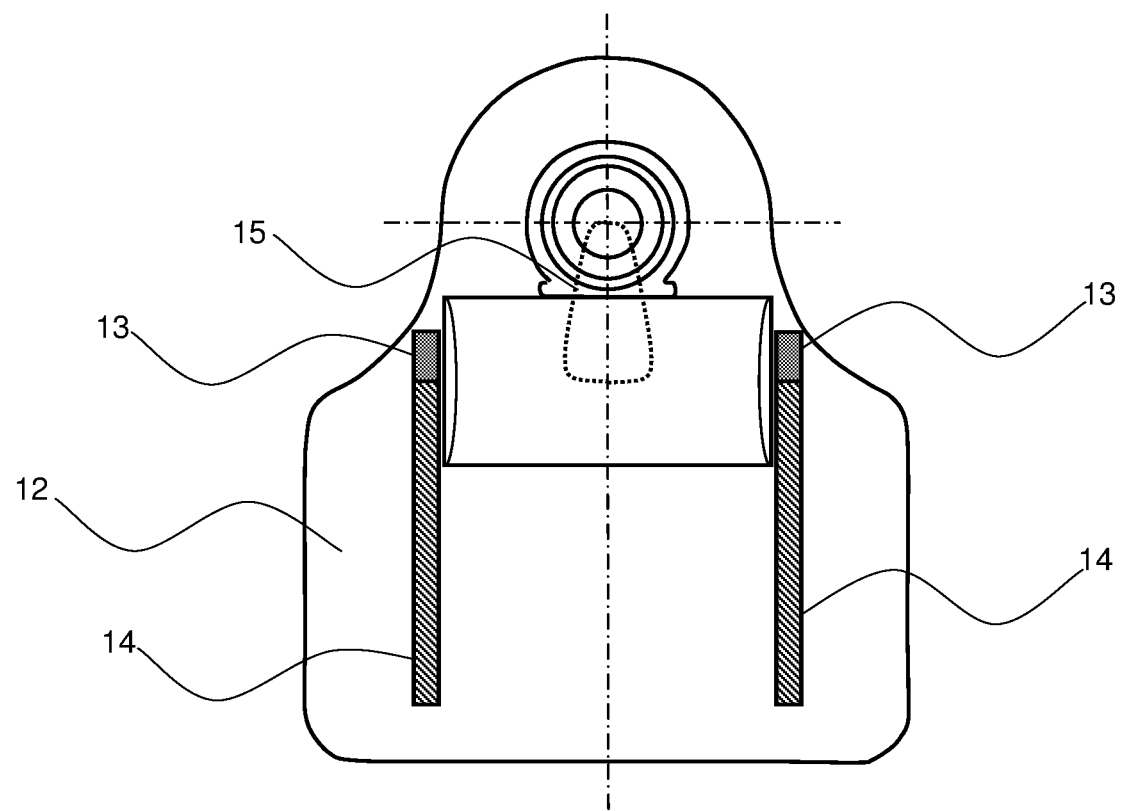

The invention will be illustrated with reference to somewhat stylized drawings of an exemplary embodiment of an animal ear tag according to the invention:

FIG. 1: shows a first exemplary animal ear tag according to the invention in an exploded illustration, FIG. 2: shows a second exemplary animal ear tag according to the invention in a front view. A dotted line surrounds that region 15 within which the total center of gravity of those parts of the animal ear tag which are to be considered part of the active animal ear tag is to lie.

Figure 3:
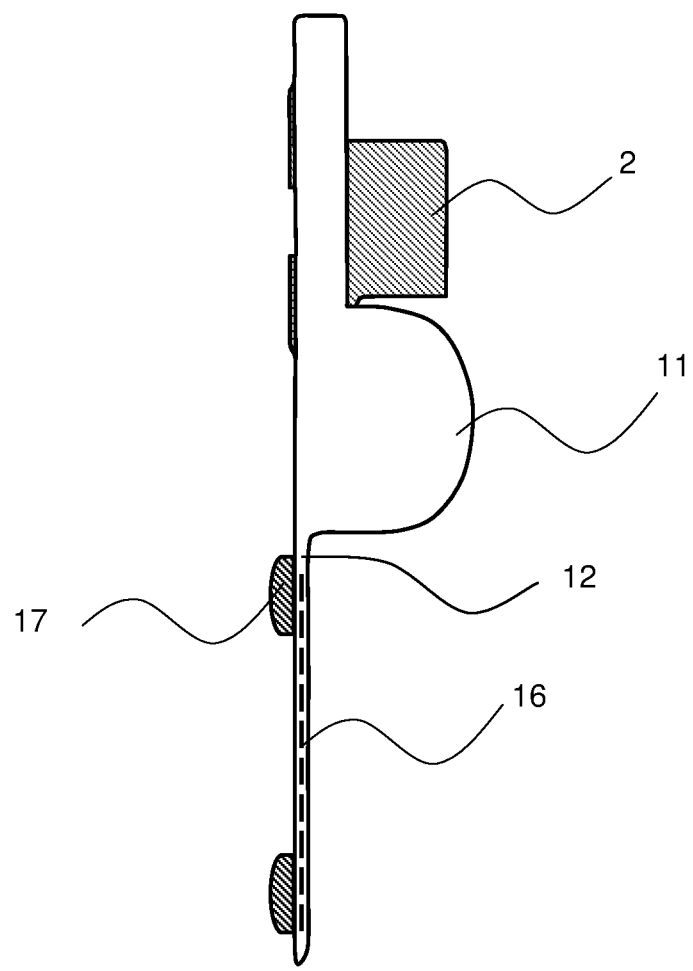

FIG. 3: shows a third exemplary animal ear tag according to the invention in a partial lateral sectional view.

Figure 4:
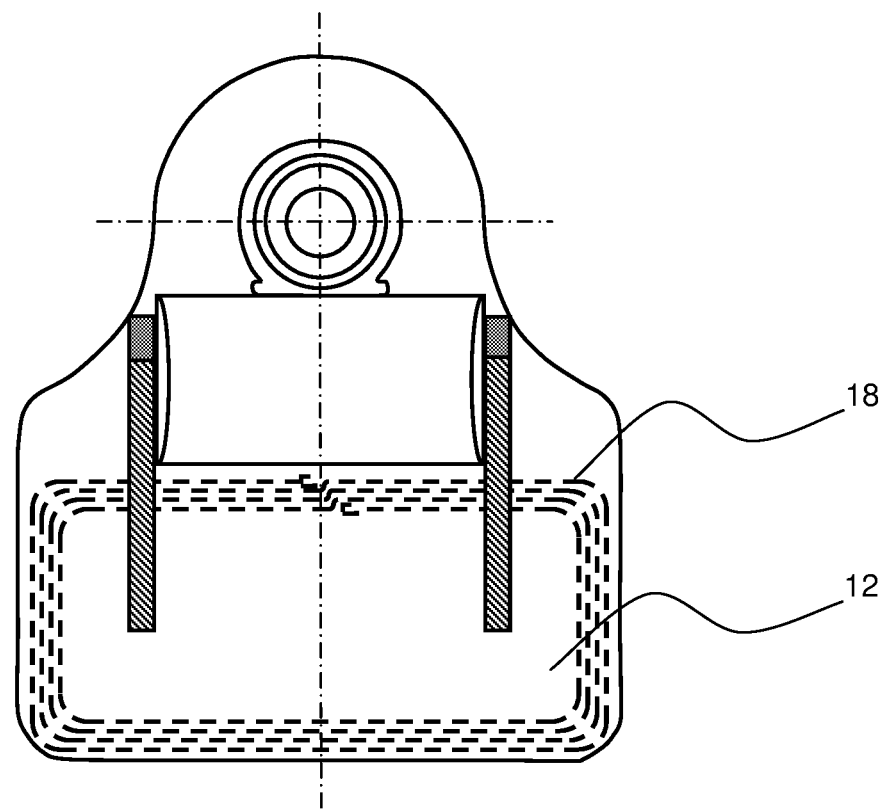

FIG. 4: shows a fourth exemplary animal ear tag according to the invention in a front view.

Figure 5:
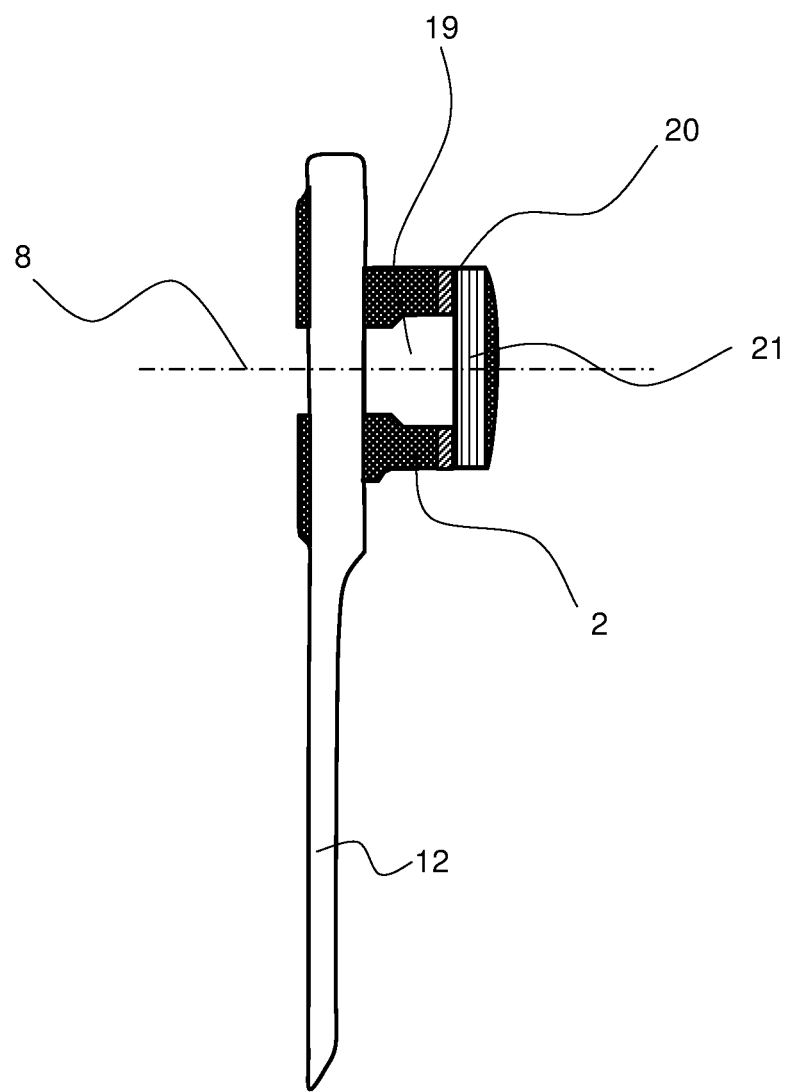

FIG. 5: shows a fifth exemplary animal ear tag according to the invention in a partial lateral sectional view.

Figure 6:
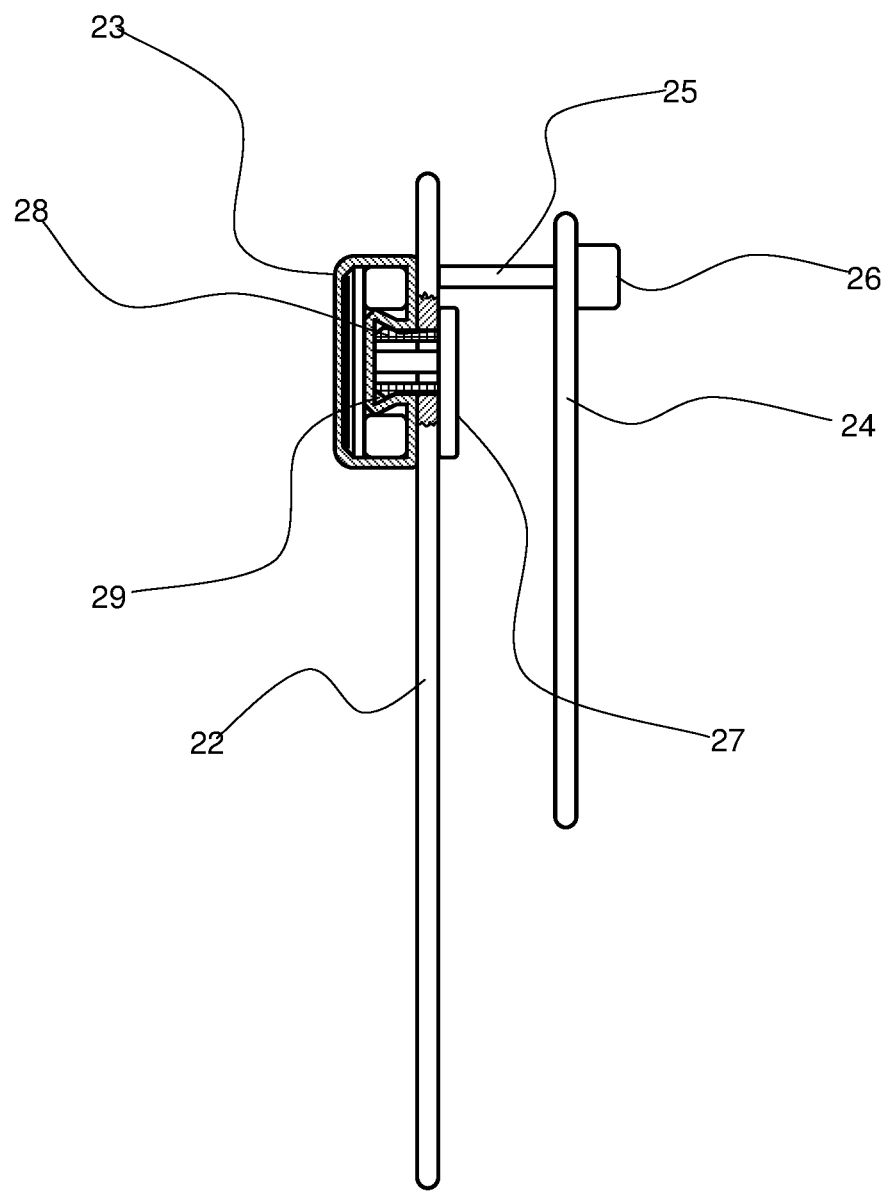

FIG. 6: shows a sixth exemplary animal ear tag according to the invention in a partial lateral sectional view.

Figure 7:
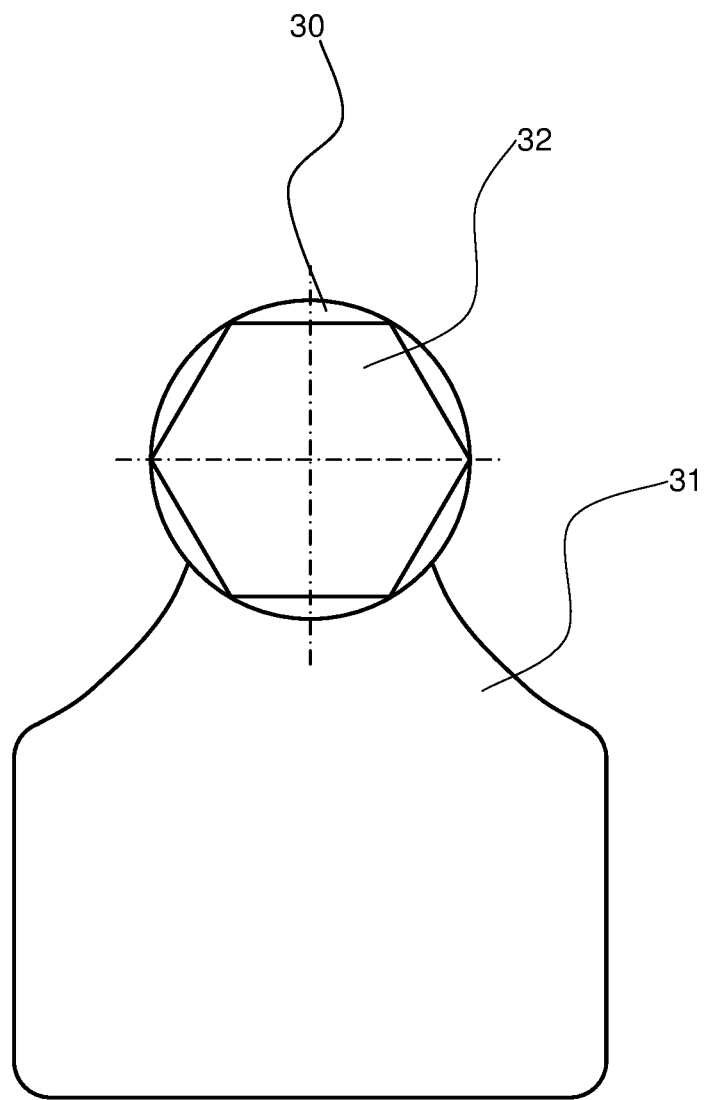
Figure 8:
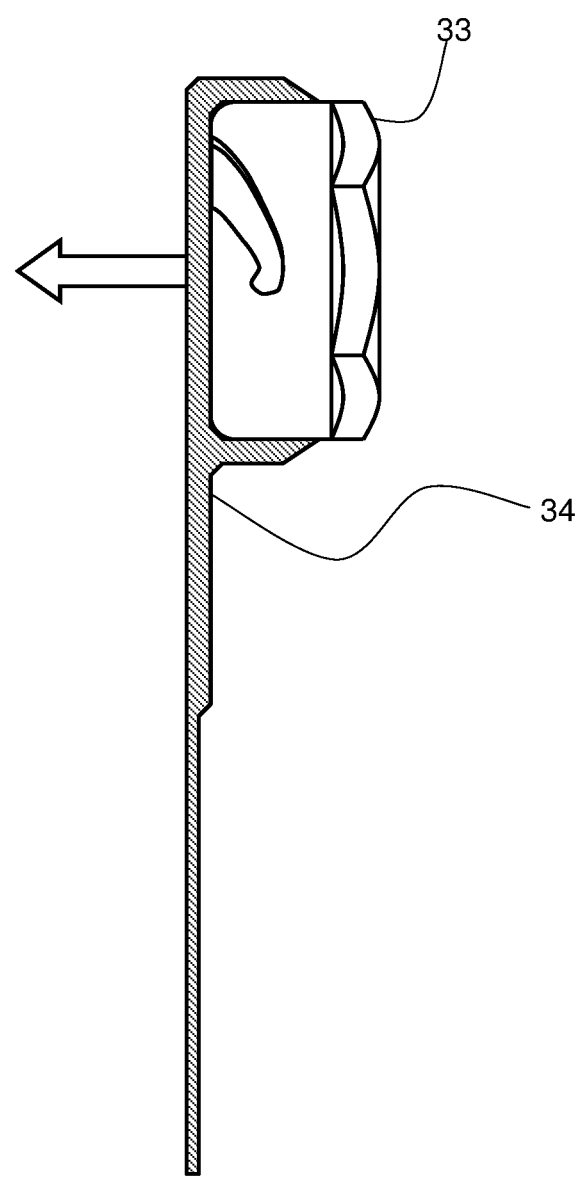

FIG. 7: shows a seventh exemplary animal ear tag according to the invention in a front view, and FIG. 8: shows an eighth exemplary animal ear tag according to the invention in a partial lateral sectional view.

The parts which are illustrated at a distance from one another in FIG. 1 are an electronics assembly 1, a housing 2 and an outer layer 3.

The electronics assembly 1 comprises a circuit board 4, electronic or electrical components 5, such as for example acceleration sensor, temperature sensor, radio interface, microcontroller RFID chip, capacitor, battery 6 and radio antenna 7 arranged thereon.

The arbor mentioned at the beginning is not shown in FIG. 1. All that is shown is the axis, designated as arbor axis 8, of those openings in the parts 1, 2 and 3 through which the arbor runs coaxially when the animal ear tag is attached.

The circuit board 4 runs in an annular shape around the arbor axis 8. The electronic components 5, 6, 7 of the electronics assembly 1 are located on the circuit board 4, in many different directions viewed from the arbor axis 8.

With respect to the mass and dimensions, the battery 6 stands out among the other parts of the electronics assembly 1. Owing to its significant influence on the position of the center of gravity of the total animal ear tag, the battery 6 is arranged as close as possible to the arbor axis 8.

As illustrated, the radio antenna 7 is preferably located above the arbor axis 8. The radio antenna 7 serves for wireless transmission of data between the active animal ear tag and one or more radio nodes which are typically located several meters to several kilometers away. Since the radio antenna 7 is as far as possible from the battery 6 and additionally arranged at the highest possible point of the animal ear tag, the transmission and reception quality is improved compared to other designs in terms of the energy which is consumed.

The housing 2 encapsulates the electronics assembly 1. The housing 2 is composed of a shell-shaped part which can be seen in FIG. 1 and a lid-shaped part (not shown in FIG. 1) with which the shell-shaped part can be closed as soon as the electronics assembly 1 is arranged therein. The housing 2 also includes, in particular, the housing wall 9 which is in the form of a circular-cylindrical jacket and bounds the through opening for the arbor, as well as a wall region 10 which, according to the intended use, closely surrounds the battery 6. The wall region 10 directly adjoins the lower part of the housing wall 9.

By virtue of this arrangement, the total center of gravity of the animal ear tag is as close as possible to the arbor axis 8, but still clearly below the arbor axis 8 when the animal ear tag is attached to the animal ear with the orientation according to the intended use.

Since the housing 2 has to provide mechanical protection for the electronics assembly 1, it is composed of a hard plastic.

The outer layer 3 has essentially two functions and is accordingly composed of two regions which monolithically form a common body: the sheath 11 encapsulates the housing 2 and seals it off. The label surface 12 extends downward from the sheath 11, is essentially two-dimensional and according to the intended use bears the identification information for the animal (in particular the life number), which can be read with the naked eye. The outer layer 3 is preferably composed of rubber-like elastic plastic and is preferably formed by putting the entire closed housing 2 together with the electronics assembly 1 which is enclosed thereby in an injection mold and encapsulating it by injection molding of the plastic material which forms the outer layer 3.

Since the outer layer 3 is flexible and soft, the animal ear tag is more pleasant to wear for the animal than if were hard. Since the label surface 12 is flexible, it virtually never catches on objects against which the animal's ear brushes.

Furthermore, with respect to preferred optional features of an animal ear tag according to the invention the following is stated:

The electrical contacts can be led out from the electronics assembly 1 through the wall of the housing 2 and, if appropriate through the outer sheath 11, in order to provide electrically conductive connections into the electronics assembly. Information can be input or read via these electrical connections, updates can be uploaded or else the battery 6 can be charged.

The energy supply of the animal ear tag can be expanded by a combination of a capacitor and an induction coil in addition to the (chargeable) battery 6. The capacitor, which like the battery can also be relatively heavy and bulky, is preferably also located as close as possible to the arbor axis 8. For the charging, an external electromagnetic AC field induces current in the induction coil, which current is conducted into the capacitor by intermediately connected electronic components (at least one diode) and charges said capacitor. The induction coil is preferably formed by turns in a flexible electrical conductor which is embedded in the label surface 12, wherein the planes of the turns lie parallel to the plane of the label surface 12.

The animal ear tag in FIG. 2 is supplemented with respect to that in FIG. 1 by light emitting diodes 13 and light emitting surfaces 14 which are embedded in the label surface 12. The light emitting diodes 13 are actuated from the electronics assembly 1 and feed light into the light emitting surfaces 14. The light emitting surfaces 14 can be formed from a transparent flexible material, typically from a plastic strip or a very thin glass strip. Through boundary layer reflection they convey in them light which has been input and output part of the light into the surroundings at their boundary faces. As a result, from the outside they appear to be a brightly illuminated surface. Compared to light being output solely by a small number of light emitting diodes 13, the light emitting surface and therefore the visibility can be increased in this way with very good energy efficiency. Since, if appropriate, a plurality of differently colored light emitting diodes 13 can feed light into the light emitting surfaces 14, a multiplicity of different states can be signaled in a very visible fashion at very low cost. Such signaled states can be e.g.: "the animal is here", the animal is on heat, sickness, lameness, childbirth phase, chewing the cud, etc. The states and the fact that they are to be signaled are typically detected by sensors and a control logic in the electronics assembly 1. By arranging a large number of light emitting surfaces 14 which can be actuated individually, the label surface 12 can be expanded into a virtually proper display surface, with the result that gradations of states etc. can be displayed and that therefore data from the electronics assembly 1 can also be output in the form of readable characters. For example, the life number of an animal can be displayed on the label surface 12 in this way. The life number must for this purpose be stored in an electronic data memory in the electronics assembly 1 and should no longer be capable of being changed once it has been set. As is known from many RFID tags this can be done by setting a so-called blocking bit. As an addition or alternative to light emitting strips it is also possible to arrange solar cells on the outer layer of the animal ear tag which solar cells are used to charge the battery of the active animal ear tag or a capacitor.

FIG. 3 and FIG. 4 show animal ear tags according to the invention in which an antenna 16, 18 is inserted into the label surface 12, which antenna 16, 18 supports electronic data transmission in which electrical signals are transmitted by so-called "body-coupled communication". During such data transmission, electrical signals signifying information are transmitted using the body of living beings as an electrical conductor. In this context, in an enclosed electrical AC circuit, a transmitter, the body of a human or an animal, and a receiver are connected in series, wherein the transmitter and receiver each have two poles, and wherein on at least one of the two devices one pole is a connection of capacitance (that is to say of an electrical capacitor), and the second connection thereof is ground, that is to say the surroundings, and wherein the second connection of the transmitter or receiver is either directly connected—that is to say galvanically connected—or are connected via a further capacitance or inductance, to the human or animal body. The base frequency of the AC circuit is normally of the order of magnitude of 10 kilohertz up to 1 megahertz here. Such data transmission has been known at least since 1984. A known application example relates to the blocking of a car door which is equipped in this way and which can be triggered by a person who carries along an electronic device as a key, which device emits an identifier via the person's body, touching the car. In the case of body-coupled communication, either planar conductor surfaces which are as large as possible (capacitive transmission) or coils with the largest possible diameter (inductive transmission) are used as antennas (poles) for exchanging signals with the surroundings through an electrical displacement current or by an AC magnetic field.

In the case of the animal ear tag according to FIG. 3, a conductor surface 16 with a large area is embedded as a capacitively operating antenna for body-coupled communication into the label surface 12 in such a way that said conductor surface 16 is electrically insulated from the surface of the label surface 12. Support bodies 17, which are embodied in an electrically insulating fashion, on the side of the animal ear tag facing the animal's ear are spacer elements with respect to the main surface of the animal's ear and therefore prevent a type of short circuit of the signal transmission.

In the animal ear tag according to FIG. 4, an inductively operating antenna 18 for body-coupled communication is embedded in the label surface 12. The antenna 18 is formed by a coil of a flexible electrical conductor, the turns of which enclose the largest possible area for which reason they predominantly run at the edge region of the label surface 12. The effectiveness of the antenna 18 also rises with the number of turns.

FIG. 5 shows an inventive design of an animal ear tag in which the hollow region into which an arbor which serves to secure the animal ear tag to the animal's ear projects from the backing plate is not a duct which is open on both sides but rather a blind hole 19. An annular circuit board 20 runs around the circular-cylindrical-shaped lateral surface of the blind hole 19. A flat disk-shaped battery 21 is located on the closed end side of the blind hole 19. Under otherwise identical peripheral conditions, it is therefore possible to make the dimensions of the housing of the active animal ear tag significantly smaller in the plane parallel to the label surface 12 compared to the previously presented designs. However, as a result the housing is slightly deeper in the direction which is perpendicular with respect to the label surface. At any rate it is again readily possible to dimension the animal ear tag in such a way that the center of gravity of the total animal ear tag is just below the arbor axis 8.

According to FIG. 6, an animal ear tag according to the invention is formed in which a label surface 22 and a housing 23 (which encloses an electronics assembly and a battery) are detachably connected to one another.

The animal ear tag in FIG. 6 has as parts the label surface 22, the rear label 24, the arbor 25 and the arbor receptacle 26. The arbor 25 is embodied in one piece with the label surface 22. The arbor receptacle 26 is embodied in one piece with the rear label 24. When the animal ear tag is attached, the arbor 24 runs through a hole in the ear concha of the animal and is hooked with its tip in the arbor receptacle 26.

Ideally the housing 23 itself already encloses the electrical and/or electronic components and possibly also the electrical energy storage means in a fluid-tight fashion. In this way, relatively high protection against damage is achieved, in particular during assembly and disassembly. Connecting hooks 28 are attached to the backing plate 27 of the housing 23. The connecting hooks 28 latch into an undercut of the housing opening 29 of the housing 23 through elastic prestress.

The housing 23 is preferably attached to the label surface 22 close to the end of the foot of the arbor 25. In this way, unnecessary swinging to and fro of the animal ear tag is prevented. Otherwise there would be a risk of injury to the animal which is wearing the animal ear tag. There would also be a risk of damage to the animal ear tag itself, since the ear tag would repeatedly impact against objects.

A further embodiment variant is that the connecting lugs (28) which connect the housing (23) and backing plate (27) do not run through holes in the label surface 22 but instead run past the label surface 22 on each side of a neck-shaped constriction (not illustrated).

FIG. 7 shows a further principle of a detachable connection between an active ear tag and a label surface 31. In this case, the housing 30 of the active ear tag can be connected to, and disconnected from, the label surface 31 by means of a relative rotational movement with respect thereto. In order to be able to satisfactorily execute the rotational movement, a part 31 of the outer sheath of the housing 30 is embodied in a hexagonal shape in the manner of a hexagonal screwhead.

(Instead of the hexagonal geometry it is, of course, also possible to provide a different geometry which is adapted to the engagement of a rotary tool).

According to FIG. 8, the detachable connection between the housing 33 of an active ear tag and the label surface 34 is embodied as a bayonet connection between the label surface 34 and the housing 33.

In one alternative design, it would, for example, also be possible to provide a screw connection with stiff movement instead of a bayonet closure. ("Stiff movement" means in this sense that the screw part and nut part bear one against another under compressive prestress and as a result are held against one another without play and can be moved with respect to one another only by overcoming friction).

It is emphasized that the outlined and explained detachable connections between the label surface and the active animal ear tags or active animal ear tag parts are only examples of such inventive connections and that there is a virtually infinite variety of suitable connecting possibilities.

The invention claimed is:

1. An animal ear tag which can be secured according to intended use to an animal's ear by means of an arbor, wherein the arbor projects from a backing plate or a rear label through a passage hole in the ear concha of the animal's ear along an arbor axis into an opening in the animal ear tag and is secured there, wherein the animal ear tag has a housing which encloses an electronics assembly and a battery, and a label surface on which identification information about the animal can be seen in directly readable characters according to intended use, wherein the label surface is located underneath the housing when the animal ear tag is attached to the animal, wherein the center of gravity of the housing and of the parts enclosed by the latter lies within a region which projects downward from the arbor axis and is not higher than 2 cm and not wider than 1 cm in the horizontal which is located perpendicularly with respect to the arbor axis.

2. The animal ear tag as claimed in claim 1, wherein the arbor projects into the opening which is surrounded by the housing, and in that the battery is arranged directly on the side of a housing wall which faces away from the opening, said housing wall bounding the opening.

3. The animal ear tag as claimed in claim 2, wherein it has only a single battery, and in that the latter is arranged at the lower region of the housing wall.

4. The animal ear tag as claimed in claim 2, wherein the electronics assembly has a capacitor which is arranged on the housing wall, and in that an induction coil is additionally arranged on the animal ear tag, the induced current of which can be fed into the capacitor.

5. The animal ear tag as claimed in claim 1, wherein the electronics assembly has a circuit board which extends in an annular shape around the arbor axis.

6. The animal ear tag as claimed in claim 1, wherein a radio antenna is arranged above the arbor axis.

7. The animal ear tag as claimed in claim 1, wherein the label surface is embodied monolithically with a sheath of the housing.

8. The animal ear tag as claimed in claim 1, wherein a light emitting diode and a light emitting surface made of transparent material are arranged on the label surface, wherein the light emitting diode is configured to input light into the transparent material of the light emitting surface.

9. The animal ear tag as claimed in claim 1, wherein an antenna for body-coupled communication is embedded in the label surface.

10. The animal ear tag as claimed in claim 1, wherein the housing is detachably connected to the label surface.

11. The animal ear tag as claimed in claim 10, wherein the housing is connected to the label surface by latching.

12. The animal ear tag as claimed in claim 10, wherein the housing and the label surface are connected by a bayonet connection or screw connection.

* * * * *